United States Patent
Nelson et al.

(10) Patent No.: US 12,462,916 B2
(45) Date of Patent: Nov. 4, 2025

(54) PROVIDING CLEARANCE, NOTIFICATION, AND SELECTION OF USE RELATED TO CERTIFICATION OF 3D ANATOMICAL MODELS FOR PRESURGICAL PLANNING

(71) Applicants: Steven A. Nelson, San Jose, CA (US); Fred Herold, Boulder, CO (US); Ryan Hess, Cary, NC (US); Jeanette Wall, Warner Robins, GA (US); Gary Turner, Weston, FL (US); Patrick Gannon, Santa Rosa, CA (US)

(72) Inventors: Steven A. Nelson, San Jose, CA (US); Fred Herold, Boulder, CO (US); Ryan Hess, Cary, NC (US); Jeanette Wall, Warner Robins, GA (US); Gary Turner, Weston, FL (US); Patrick Gannon, Santa Rosa, CA (US)

(73) Assignee: Ricoh Company, Ltd., Tokyo (JP)

( * ) Notice: Subject to any disclaimer, the term of this patent is extended or adjusted under 35 U.S.C. 154(b) by 797 days.

(21) Appl. No.: 17/688,795

(22) Filed: Mar. 7, 2022

(65) Prior Publication Data
US 2023/0282330 A1 Sep. 7, 2023

(51) Int. Cl.
*G16H 20/40* (2018.01)
*G05B 19/4099* (2006.01)
(Continued)

(52) U.S. Cl.
CPC ......... *G16H 20/40* (2018.01); *G05B 19/4099* (2013.01); *G06Q 30/018* (2013.01); *B33Y 50/00* (2014.12); *G05B 2219/49023* (2013.01)

(58) Field of Classification Search
CPC ........ G16H 20/40; G16H 40/67; G16H 30/20; G16H 30/40; G16H 50/50; G05B 19/4099;
(Continued)

(56) References Cited

U.S. PATENT DOCUMENTS 8,639,484 B2    1/2014   Sun et al.
8,735,773 B2    5/2014   Lang
(Continued)

FOREIGN PATENT DOCUMENTS

WO    WO 2018/069736 A1    4/2018

OTHER PUBLICATIONS

Hess, U.S. Appl. No. 17/196,842, filed Mar. 9, 2021, Non-Final Rejection, Nov. 23, 2022.
(Continued)

*Primary Examiner* — Keith D Bloomquist
(74) *Attorney, Agent, or Firm* — Hickman Becker Bingham Ledesma LLP

(57) ABSTRACT

Techniques for providing clearance, notification, and selection of use related to certification of 3D anatomical models for pre-surgical planning are provided. In one technique, a collection of sets of one or more files for generating a 3D anatomical model is stored. First input to print a 3D anatomical model based on a set of one or more files in the collection is received from a requester computer. In response to determining that the to-be-printed 3D anatomical model is not associated with a predetermined certification, a user interface is updated to indicate that the 3D anatomical model cannot be used for a diagnostic purpose. Second input that indicates that a user of the requester computer accepts using the 3D anatomical model for only non-diagnostic purposes is received. After receiving the second input, the 3D anatomical model is generated.

15 Claims, 5 Drawing Sheets

(51) Int. Cl.
*G06Q 30/018* (2023.01)
*B33Y 50/00* (2015.01)

(58) Field of Classification Search
CPC ........ G05B 2219/49023; G06Q 30/018; B33Y 50/00
See application file for complete search history.

(56) References Cited

U.S. PATENT DOCUMENTS

| | | | |
|---|---|---|---|
| 8,818,544 | B2 | 8/2014 | Nehme et al. |
| 8,888,480 | B2 | 11/2014 | Yoo et al. |
| 9,862,149 | B2 | 1/2018 | Wang et al. |
| 10,143,555 | B2 | 12/2018 | DeFelice et al. |
| 10,275,548 | B1* | 4/2019 | Kodali ................. G06F 30/20 |
| 10,338,567 | B2 | 7/2019 | Guimbretiere et al. |
| 10,399,374 | B2 | 9/2019 | Kritchman |
| 10,433,858 | B2 | 10/2019 | Zubrod |
| 10,736,698 | B2 | 8/2020 | Bohl |
| 10,765,658 | B2 | 9/2020 | Estey et al. |
| 10,902,944 | B1 | 1/2021 | Casey et al. |
| 11,033,336 | B2 | 6/2021 | Bohl |
| 11,112,770 | B2 | 9/2021 | Roh et al. |
| 12,133,803 | B2* | 11/2024 | Casey ................. G16H 50/50 |
| 2002/0059049 | A1* | 5/2002 | Bradbury .............. G16H 40/67 703/11 |
| 2007/0162295 | A1* | 7/2007 | Akhtar ................. G16H 20/40 705/2 |
| 2008/0187895 | A1* | 8/2008 | Sakezles .............. G09B 23/306 434/272 |
| 2014/0122027 | A1* | 5/2014 | Andreiko ................ A61B 1/24 703/1 |
| 2014/0156053 | A1 | 6/2014 | Mahdavi |
| 2015/0120806 | A1 | 4/2015 | Lippincott |
| 2016/0022370 | A1* | 1/2016 | Pavlovskaia ......... A61B 17/154 703/1 |
| 2017/0157853 | A1 | 6/2017 | Gallinaro et al. |
| 2017/0218660 | A1 | 8/2017 | Muchna et al. |
| 2017/0235848 | A1 | 8/2017 | Van Dusen et al. |
| 2019/0016057 | A1 | 1/2019 | Manners |
| 2019/0102815 | A1 | 4/2019 | Norman |
| 2022/0020223 | A1 | 1/2022 | Van Bael et al. |
| 2022/0254466 | A1* | 8/2022 | Hwang ................. G16H 20/00 |
| 2022/0291660 | A1 | 9/2022 | Hess et al. |
| 2023/0014384 | A1* | 1/2023 | Cordonnier ........... B29C 64/386 |
| 2023/0285081 | A1* | 9/2023 | Wagner ................. A61B 34/10 |

OTHER PUBLICATIONS

Hess, U.S. Appl. No. 17/196,842, filed Mar. 9, 2021, Non-Final Rejection, Dec. 7, 2023.

Hess, U.S. Appl. No. 17/196,842, filed Mar. 9, 2021, Advisory Action, Sep. 8, 2023.

Nelson, U.S. Appl. No. 17/688,808, filed Mar. 7, 2022, Non-Final Rejection, Feb. 7, 2023.

* cited by examiner

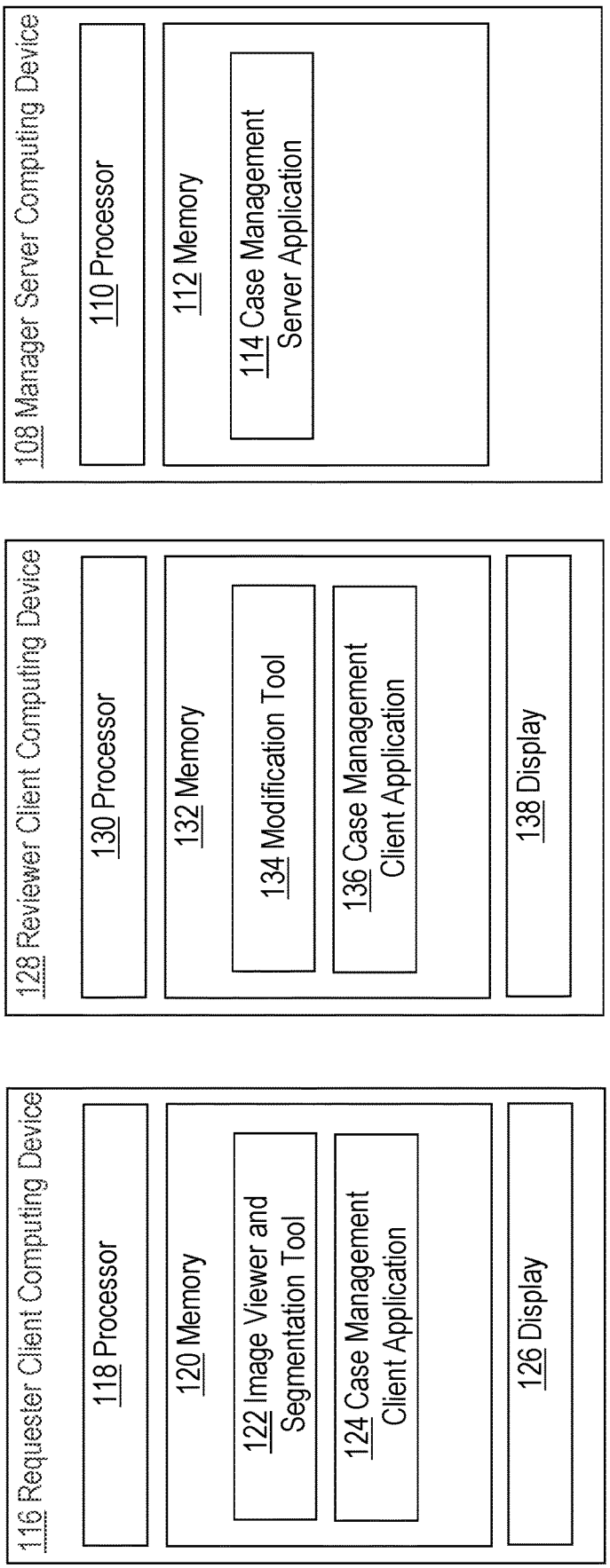

| Initiation | Custom Quoting | Engineering Services | Customer Approval | Print Production | Invoicing |

Model Details
Order Number
O-38032
Model Name
***
Anatomical Model Type*
[Cardio]
Pathology*
[ ]
Body Part*
[ ]
Laterality
[ ]

Choose Usage Type
○ Diagnostic
☒ Non-Diagnostic — 320

Anatomical model types with 510k Clearance cannot be used diagnostic use when printing for non-diagnostic use — 310

[Back]   [Submit] — 330

PROVIDING CLEARANCE, NOTIFICATION, AND SELECTION OF USE RELATED TO CERTIFICATION OF 3D ANATOMICAL MODELS FOR PRESURGICAL PLANNING

CROSS-REFERENCE TO RELATED APPLICATIONS

This application is related to U.S. patent application Ser. No. 17/196,842, filed Mar. 9, 2021, the entire contents of which are hereby incorporated by reference as if fully set forth herein.

This application is related to U.S. patent application Ser. No. 17/688,808, filed Mar. 7, 2022, the entire contents of which are hereby incorporated by reference as if fully set forth herein.

TECHNICAL FIELD

The present application relates generally to printing and, more specifically, to a 3D print portal to assist in approving 3D printable files.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Technology for healthcare is a rapidly evolving market. Within this market, one of the quickest growing segments is the creation of patient-specific tools that help healthcare professionals personalize care to each individual. An example patient-specific tool is a 3D model, which is an exact replica of a specific part of a patient on which a surgeon will be operating. 3D models are beneficial in a number of ways. For example, surgeons can use the 3D models to show patients exactly what will be operated on so that the patients are well informed. In addition, surgeons can use these models to plan their surgery and achieve better results including less time spent in operating rooms and less chance for errors. Yet, creating and obtaining a printed anatomical part or any object is often a time-consuming and expensive process. Printing a complex 3D object, such as an anatomical part, may already take hours to several days to complete. While surgical planning is a primary use case for 3D anatomical models, there are other use cases that do not require the same precision and accuracy that are expected of typical 3D anatomical models. Lack of a solution to account for multiple use cases with varying degrees of accuracy and precision wastes time and computing resources that are not required for such use cases.

BRIEF DESCRIPTION OF THE DRAWINGS

In the figures of the accompanying drawings like reference numerals refer to similar elements.

FIG. 2A depicts an example requester client computing device, according to an embodiment.

FIG. 2B depicts an example reviewer client computing device, according to an embodiment.

FIG. 2C depicts an example manager server computing device, according to an embodiment.

FIG. 3 is an example user interface 300 for initiating an order of a 3D anatomical model, in an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. ARCHITECTURE OVERVIEW
   A. NETWORK
   B. REQUESTER SYSTEM
   C. REVIEWER CLIENT COMPUTING DEVICE
   D. DATA REPOSITORY
   E. IMAGE STORAGE
   F. MANAGER SERVER COMPUTING DEVICE
III. ORDER INITIATION
   A. CERTIFICATION
   B. DIAGNOSTIC USE
   C. CHANGING DIAGNOSTIC USE STATUS
IV. PROCEDURAL OVERVIEW
V. EXAMPLES
VI. IMPLEMENTATION EXAMPLES

I. OVERVIEW

According to various embodiments, computer-implemented apparatuses, methods, and systems are provided for an electronic portal that provides capabilities for processing orders for 3D anatomical models. In one technique, a 3D print portal receives, from a requester system via one or more APIs, a first API call that the requester system has saved 3D printable files in a data repository. In response to receiving the first API call, the 3D print portal sends, to the requester system, a user interface form to initiate a production ordering process of printing the 3D printable files. Through the user interface form, a user is able to input various data items pertaining to printing a 3D anatomical model.

Embodiments allow healthcare professional users to have more flexibility in printing 3D anatomical models. A new 3D print portal interacts with existing image file viewing systems using an API. Technical benefits include ease of obtaining an accurate 3D anatomical model leveraging a new portal architecture.

II. ARCHITECTURE OVERVIEW

Figure 1:
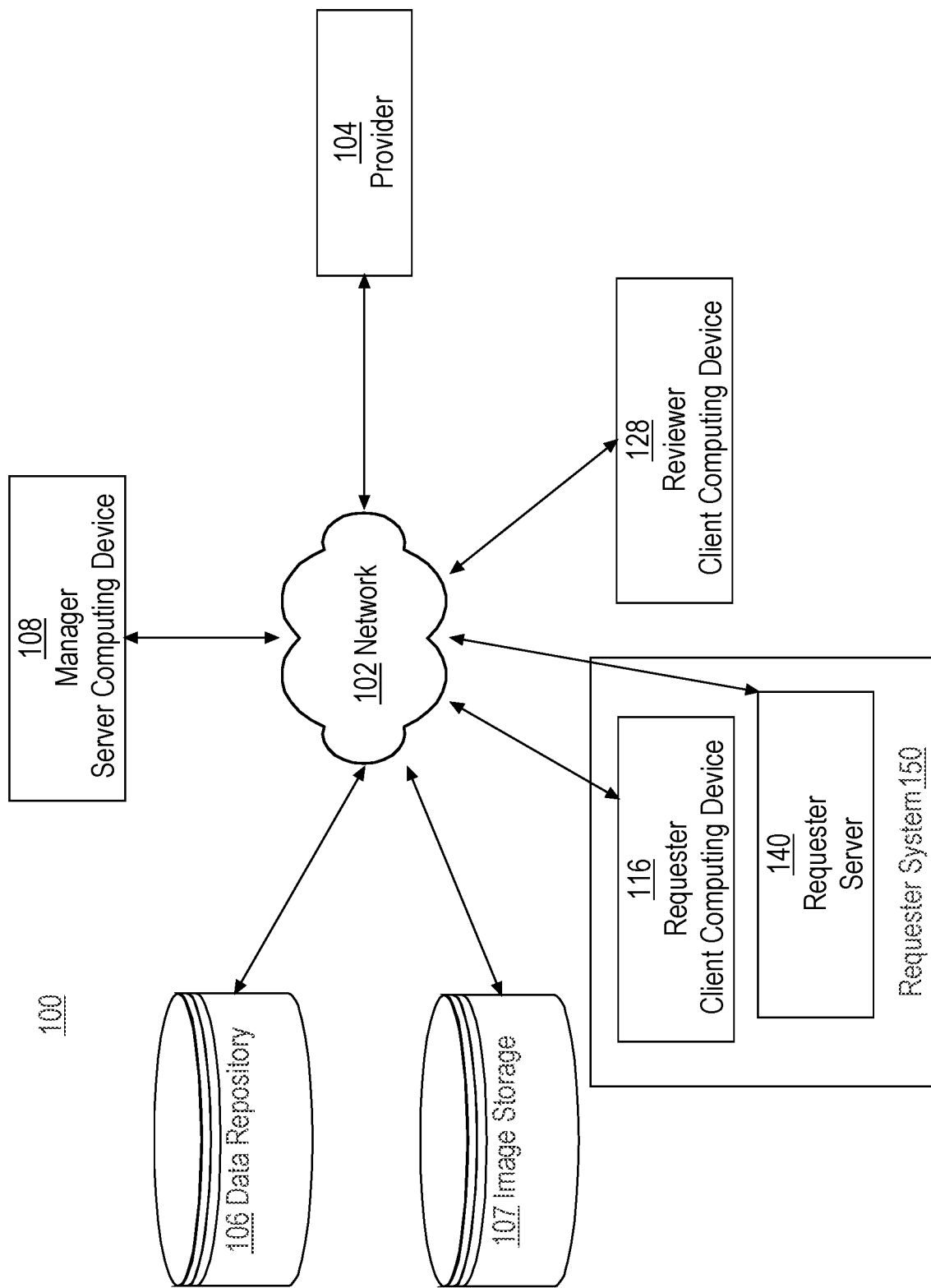
FIG. 1 depicts a networked computer system, according to an embodiment.

FIG. 1 depicts a networked computer system 100, according to an embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C, or any other suitable programming environment.

Although components of FIG. 1 are depicted and described herein in one particular configuration, this is done for explanation purposes only and the components of FIG. 1 may be configured in any manner. In the example of FIG. 1, the networked computer system 100 includes one or more marketplace providers 104 (individually and collectively), a data repository 106, an image storage 107, a manager server computing device 108, one or more requester client computing devices 116 (individually and collectively), one or more requester servers 140, a requester system 150, and one or more reviewer client computing devices 128 (individually and collectively), all of which are communicatively coupled via a network 102.

FIG. 1 depicts only one of many possible arrangements of components configured to execute the programming described herein. Other arrangements may include fewer or different components, and the division of work between the components may vary depending on the arrangement. For example, as described below, image viewing, segmenting Digital Imaging and Communications In Medicine (DICOM) images and generating 3D printable files from segmented DICOM images may be performed on a requester client computing device 116 and/or on a requester server 140, while viewing and modifying 3D printable files may be performed on a reviewer client computing device 128. However, image viewing, segmenting DICOM images, generating 3D printable files from segmented DICOM images, and/or viewing and modifying 3D printable files may be performed on the manager server computing device 108, in an embodiment. Embodiments are described here in the context of the DICOM standard for purposes of explanation, but embodiments are not limited to the DICOM standard and are applicable to other standards.

A. Network

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect to the network 102 and the disclosure presumes that all components of FIG. 1 are communicatively coupled via network 102. The various components depicted in FIG. 1 may also communicate with each other via direct communications links that are not depicted in FIG. 1 for purposes of explanation.

B. Requester System

A requester system 150 comprises one or more requester client computing devices 116 and one or more requester servers 140. Each of the requester client computing device 116 and the requester server 140 are communicatively coupled to the network 102. Alternatively, the requester client computing device 116 and the requester server 140 are implemented on the same device. In other words, the requester system 150 may only comprise a single computing device.

Each of the requester client computing device 116 and the requester server 140 of FIG. 1 may be implemented by any type of computing device. The requester client computing device 116 and the requester server 140 are separate entities and may be geographically separated but may be configured to communicate with each other in a client-server relationship over a LAN or WAN. The requester server 140 may be implemented on one or more computing devices. Example implementations of the requester client computing device 116 include, without limitation, workstations, personal computers, laptop computers, tablet computers, personal digital assistants (PDAs), cellular telephony devices and any type of mobile devices.

FIG. 2A depicts an example of the requester client computing device 116. The requester client computing device 116, operated by a healthcare professional user, includes a processor 118, memory 120 that includes an image viewer and segmentation tool 122 and a case management client application 124 executed by the processor 118, and a display 126.

The image viewer and segmentation tool 122 allows the healthcare professional user of the requester client computing device 116 to view and segment medical images and to generate 3D printable files from segmented medical images in collaboration with the requester server 140. An example of a viewer and segmentation tool 122 is the IBM iConnect® Access. Medical images may include medical images of anatomies. An example of a medical image is a DICOM image.

The case management client application 124 provides portal functionality that allows the healthcare professional of the requester client computing device 116 to submit a 3D print request, transfer (e.g., upload, download) and view data, such as DICOM images and/or 3D printable files, and communicate with an application engineer user(s) regarding production requirements (e.g., messaging, video chatting, etc.) in collaboration with the requester server 140. The 3D print request includes print data for an object to be 3D printed. The print data may include a description of the object to be 3D printed, printing specifications, requester information, patient information, shipping information, billing information, or a combination thereof. 3D printable files may be STL (Standard Tessellation Language or STereoLithography) files, 3MF (3D Manufacturing Format) files, or other files suitable for 3D printing.

In an embodiment, installation of application-specific client software (e.g., case management client application 124) is not required. For example, an embodiment may use a browser to communicate with a compatible HTTP server at the manager server computing device 108. For another example, an embodiment may use application programming interfaces (APIs) to allow the image viewer and segmentation tool 122 to exchange data with a case management server application at the manager server computing device 108 without leaving the image viewer and segmentation tool 122. Examples of an API that may be implemented include an HTTP API, a REST API, and a Web API.

C. Reviewer Client Computing Device

A reviewer client computing device 128 of FIG. 1 may be implemented by any type of computing device. Example implementations of reviewer client computing device 128 include, without limitation, workstations, personal computers, laptop computers, tablet computers, personal digital assistants (PDAs), cellular telephony devices and any type of mobile devices.

FIG. 2B depicts an example reviewer client computing device 128. The reviewer client computing device 128, operated by an application engineer user, includes a processor 130, memory 132 that includes a modification tool 134 and a case management client application 136 executed by the processor 130, and a display 138.

The modification tool 134 allows the application engineer user of the reviewer client computing device 128 to view and modify 3D printable files, which may be STL files, 3MF files, or other files suitable for 3D printing.

The case management client application 136 provides portal functionality that allows an application engineer professional of the reviewer client computing device 128 to transfer (e.g., upload, download) and view data, such as DICOM images and/or 3D printable files, communicate with a healthcare professional user(s) regarding production requirements (e.g., messaging, video chatting, etc.).

In an embodiment, installation of application-specific client software (e.g., case management client application 136) is not required. For example, an embodiment may use a browser to communicate with a compatible HTTP server at the manager server computing device 108. For another example, an embodiment may use application programming interfaces (APIs) to allow the modification tool 134 to exchange data with a case management server application at the manager server computing device 108 without leaving the modification tool 134.

D. Data Repository

A data repository 106 of FIG. 1 may include one or more databases. As used herein, the term "database" refers to a corpus of data, organized or unorganized, in any format, with or without a particular interface for accessing the corpus of data.

The data repository 106 may include an entity database. The entity database includes records of entities (e.g., healthcare professional users, healthcare organizations associated with healthcare professional users, application engineer users, engineering organizations associated with application engineer users, etc.). Each entity record may be created in response to an entity account setup (e.g., registration with the manager server computing device 108) and may contain contact information and authentication information for an entity.

The data repository 106 may include a case database. The case database includes records of cases. A case may refer to a medical matter or another type of matter. Each case record may be created in response to receiving a 3D print request submitted from the requester system 150 (e.g., the requester client computing device 116 or the requester server 140) and may contain print data, an initial version of a collection of one or more 3D printable files, any modified version of the collection of the one or more 3D printable files are stored in the data repository 106, quote data, invoice data, and other information relating to the request. Each case record of the case database may be associated with one or more entity records (e.g., record of requester and/or record of reviewer) of the entity database.

In an embodiment, the initial version of the collection of the one or more 3D printable files of the object may be provided at the requester client computing device 116, the requester server 140, the reviewer client computing device 128, or the manager server computing device 108. Similarly, a modified version of the collection of the one or more 3D printable files of the object may be provided at the requester client computing device 116, the requester server 140, the reviewer client computing device 128, or the manager server computing device 108.

The data repository 106 may include one or more other databases storing additional information that may be used by one or more components of the system 100. For example, data repository 106 may include a database used by a 3D print portal (described herein) to store production order and related information.

Databases may be co-located in a single data repository or may be separately located in different data repositories. Furthermore, although the data repository 106 is shown in FIG. 1 as a component separate from other components of FIG. 1, the data repository 106 may be part of another component, such as the manager server computing device 108.

E. Image Storage

An image storage 107 of FIG. 1 may include one or more databases. Image storage 107 stores DICOM images and is accessible to a DICOM viewer, such as the requester client computing device 116 (and, optionally, an associated server). Thus, the DICOM viewer loads DICOM data from image storage 107 and presents the DICOM data on a screen of a computing device. The image storage 107 may be part of a patient archiving (PAC) system, which may be part of a hospital or group of hospitals.

F. Manager Server Computing Device

The manager server computing device 108 of FIG. 1 broadly represents one or more computers, such as one or more desktop computers, server computers, a server farm, a cloud computing platform (like Amazon EC2, Google Cloud, container orchestration (Kubernetes, Docker, etc.), or a parallel computer, virtual computing instances in public or private datacenters, and/or instances of a server-based application. In an embodiment, the manager server computing device 108 is in communication with the requester system, one or more data repositories 106, and one or more reviewer client computing devices 128. In one embodiment, the manager server computing device 108 is not in direct communication with the image storage 107. Instead, the manager server computing device 108 interacts with the requester system 150 in order to access images in the image storage 107. In an alternative embodiment, the manager server computing device 108 is in direct communication with the image storage 107.

FIG. 2C depicts an example manager server computing device 108. The manager server computing device 108 includes a processor 110 and memory that includes a case management server application 114 executed by the processor 110. The case management client application 124, 136 executing on the client computing devices 116, 128 and the case management server application 114 executing on the manager server computing device 108 provide portal functionality that allows healthcare professional users and application engineer users to communicate with each other, to access and transfer data, etc., and version control functionality that allows healthcare professional users and application engineer users to access one or more versions of a collection of one or more 3D printable files.

The case management server application 114 of the manager server computing device 108 may be organized using a plurality of instructions, such as interfacing instructions, verification instructions, receiving and sending instructions, storing and retrieving instructions, alerting instructions, approving instructions, transferring instructions, and performing instructions.

The interfacing instructions may be programmed to interface, using APIs, with one or more image viewer and segmentation tools 122, with one or more modification tools 134, and/or with one or more providers 104 to exchange data.

The verification instructions may be programmed to authenticate users of client computing devices 116, 128 (and by extension, client computing devices 116, 128) verifying authentication data (e.g., username/password) provided by the client computing devices 116, 128 against authentication information stored in the entity database.

The receiving and sending instructions may be programmed to transmit data with authenticated client computing devices 116, 128 and/or one or more providers 104. Example data being transmitted include messages between a requester client computing device 116 and a reviewer client computing devices 128, different versions of a collection of one or more 3D printable files, approval indications, alerts, notifications, etc.

The storing and retrieving instructions may be programmed to store data in and retrieve data from a data repository. For example, messages transmitted by client computing devices 116, 128 and different versions of a collection of one or more 3D printable files may be stored in the data repository 106 of FIG. 1.

The transferring instructions may be programmed to transfer a new version of a collection of one or more 3D printable files to the requester server 140 for review in response to receiving an instruction (e.g., a click) from the reviewer client computing device 128.

The alerting instructions may be programmed to generate alerts, notifications, and emails to inform users of new data received. For example, an email may be generated and sent to a healthcare professional user informing the healthcare professional user that a new version of a collection of one or more 3D printable files is available for review. For another example, an email may be generated and sent to an application engineer user informing the application engineer user that feedback regarding the new version of the collection of one or more 3D printable files has been received.

The approving instructions may be programmed to "lock down" a particular version of the collection of one or more 3D printable files in response to receiving an approval indication for the particular version that has been approved by the healthcare professional user. The particular version may or may not be the latest version stored in the data repository 106. When the particular version is locked down, the particular version may be visually differentiated from other versions of the collection.

The performing instructions may be programmed to perform a plurality of tasks. Some of the plurality of tasks may be performed prior to the particular version being locked down, while others may be performed after the particular version of the collection is locked down.

An example task performed prior to the particular version being locked down is causing to generate a digital quote data. The digital quote data defines an electronic quote for 3D printing. The digital quote data may be transmitted to the requester client computing device 116, or to another computing device as specified in the print data, for approval prior to alerting the application engineer user of an initial version of the collection.

An example task performed after the particular version is locked down is causing to 3D print an object according to the particular version. Another example task performed after the particular version is locked down is causing to generate a digital invoice data. The digital invoice data defines an electronic payment invoice for the printed 3D object. The digital invoice data may be thereafter transmitted to the requester client computing device 116, or to another computing device as specified in the print data.

Other tasks are contemplated. In an embodiment one or more tasks may be completed by one or more providers 104 of FIG. 1. For example, 3D printing may be completed by a 3D printing service provider, or invoicing may be completed by an accounting service provider.

III. ORDER INITIATION

An order for a 3D anatomical model may be initiated in one or more ways. For example, after selecting a portion of a DICOM image based on user input, segmenting the selected portion, and producing a set of one or more 3D printable files based on the segmentation, the requester client computing device 116 receives input to print the set of one or more 3D printable files. The input may be received through a user interface that is presented on a screen of the requester client computing device 116. The user interface may include UI controls to present one or more images of a 3D object (e.g., a skull) based on one or more DICOM images, select a portion (e.g., the jaw of the skull) of a presented image, rotate the selected portion, and initiate 3D printing of the selected portion. Such a user interface may include a 'Send to Print' button that, when selected based on user input (e.g., using a cursor control device, moving a digital cursor the print button and selecting a physical button of the cursor control device), causes another UI to be presented that allows the user to order a 3D anatomical model based on the set of one or more 3D printable files. Selection of the 'Send to Print' button may trigger the calling of an API to a portal executing in a remote cloud system, such as the manager server computing device 108 and data repository 106. For example, selection of the 'Send to Print' button causes an order initiation UI is automatically presented in a web browser executing on requester client computing device 116.

FIG. 3 is an example UI 300 for initiating an order, in an embodiment. UI 300 is provided by the manager server computing device 108. UI 300 comprises four fields: Anatomical Model Type, Pathology, Body Part, and Laterality. UI 300 includes a pre-configured list of values for each field. Each pre-configured list originates from a database, such as data repository 106. A user of requester client computing device 116 selects from the pre-configured list.

For one or more of the fields (e.g., Anatomical Model Type, Pathology, and Body Part), there is an option called 'Other', which is selected in case the user is not able to find the value they are searching for in the corresponding pre-configured list of values. If "Other" is selected, then UI 300 is updated to present a text box next to the corresponding field. The user is able to type in a text value in that text box. In the depicted example, the Anatomical Model Type is "Cardio."

A. Certification

Certification refers to a government or other entity certifying whether 3D anatomical models generated through a particular process (or from a particular 3D model generation entity) is sufficient for diagnostic purposes. An example of such a government entity is the U.S. Food and Drug Administration (FDA). An example of such certification is 510(k) certification or clearance.

Certification may be for all 3D models that are generated through the particular process or generated from the particular 3D model generation entity. Alternatively, certification may be for 3D models pertaining to certain body parts (e.g., hips, knees, ankles), but not for others (e.g., hearts, lungs, kidneys, and livers).

In an embodiment, an order for a 3D anatomical model is associated with a 'certified' field that may have a value of 'Yes' or 'No.' Initially, the value of the certified field may have a default value, such as 'Yes', or it may be unspecified. If, for one or more reasons, an order for a 3D anatomical model cannot be certified, then the corresponding certified field may have a 'No' value that cannot be changed by a user. For example, the particular 3D model generation entity might not be certified yet.

In an embodiment, if the certified field for an order is 'No', then one or more of the following visual elements are presented in the UI (e.g., UI 350):
  a. (1) a message alert that reads, "This Model cannot be used for Diagnostic purposes"; and/or
  b. (2) a checkbox with text "I acknowledge that the model selected does not have a certification and, therefore, cannot be used for diagnostic purposes." This checkbox must be ticked for proceeding further. If this checkbox is not ticked, then user will not be allowed to proceed further through the UI or the ordering process, even though the user may have selected Submit button 330. In response to detecting that the checkbox is checked, user approval data (indicating the acknowledgement check) is generated and stored in association with the order, along with the ordering user and order details.

In an embodiment, if an order for a 3D model is certified, then an option (see "Choose Usage Type" in UI 300) is presented for the user to select if the 3D model is for Diagnostic use or Non-Diagnostic use. Data indicating this selection is stored in association with the order details. If the user selects Non-Diagnostic use (e.g., see selected option 320 in UI 300), then a warning message (such as message 310 in UI 300) may be presented to the user, such as "Anatomical model types with certification or clearance cannot be used for diagnostic use when printing for non-diagnostic use."

If an order for a 3D model is not certified, then the option for the user to select if the 3D model is for Diagnostic use or Non-Diagnostic use may be disabled with Non-Diagnostic Use pre-selected.

B. Diagnostic Use

The order or generation process may be different depending on whether Diagnostic use or Non-Diagnostic use is selected. For example, if a 3D anatomical model is to be generated for non-diagnostic use, then different materials may be used to generate the 3D anatomical model, different machines may be used to generate the 3D anatomical model, and/or fewer automatic and/or manual checks may be performed on the 3D anatomical model to ensure its accuracy or fidelity to the actual body part.

In an embodiment, one or more automatically-determined factors are used in determining whether Diagnostic use is an option for a 3D anatomical model. Examples of such factors include the quality of the 3D printable files and attributes of elements reflected in the 3D printable files. For example, if the quality of a DICOM image is below a certain threshold (e.g., image resolution is below a certain threshold), then Diagnostic use is not presented as a valid option in the order initiation process. As another example, if the walls of a body part (e.g., a blood vessel) are thinner than a particular thickness, then Diagnostic use is not presented as a valid option. As another example, a STL file that results from segmentation is automatically analyzed to determined that a diagnostic-level model cannot be generated.

In an embodiment, the user interface (e.g., UI 350) is updated to include different prices for different usage options. For example, a first price estimate may be presented on the user interface if a user selects a diagnostic use, and then a second (lower) price estimate may be presented on the user interface if the user selects a non-diagnostic use.

C. Changing Diagnostic Use Status

After an order is submitted, a member of the 3D model generation entity or a user of reviewer client computing device 128 may make changes to the 3D printable files or may determine that any 3D anatomical model that is to be generated from the 3D printable files should not be used for a diagnostic use, even though the requester client computing device 116 selected Diagnostic use for the Usage Type. For example, such a member or user may determine that their 3D model generation machines will not be able to produce a 3D anatomical model that is faithful to the anatomical item depicted in the 3D printable files. The member/user provides input that updates a diagnostic status of the corresponding order, which causes the 3D model generation entity (or reviewer client computing device 128) to transmit a message to requester client computing device 116, where the message informs the user thereof that the diagnostic status has changed from Diagnostic use to Non-Diagnostic use. In an embodiment, the system require a user to provide additional input that acknowledges a change to non-diagnostic use.

In an embodiment, a record is created and stored that indicates, for each entry, a set of one or more 3D printable files and an indication of whether a certified-level 3D model was generated therefrom. From the record, a set of training data is generated, where each training instance in the training data corresponds to a different entry in the record and includes a set of features pertaining to the corresponding 3D printable files. A label of each training instance indicates whether a certified-level 3D model was generated. Based on such training data, a machine-learned model may be learned using one or more machine learning techniques, such as linear regression. The machine-learned model may accept a set of feature values pertaining to a new set of 3D printable files and generate a score that indicates a likelihood that a certified-level 3D model can be generated from that new set of 3D printable files. If the score is low enough, then a diagnostic usage option may be disabled, even if the requested model type (selected for the new set of 3D printable files) is associated with a certification.

IV. PROCEDURAL OVERVIEW

Figure 4:
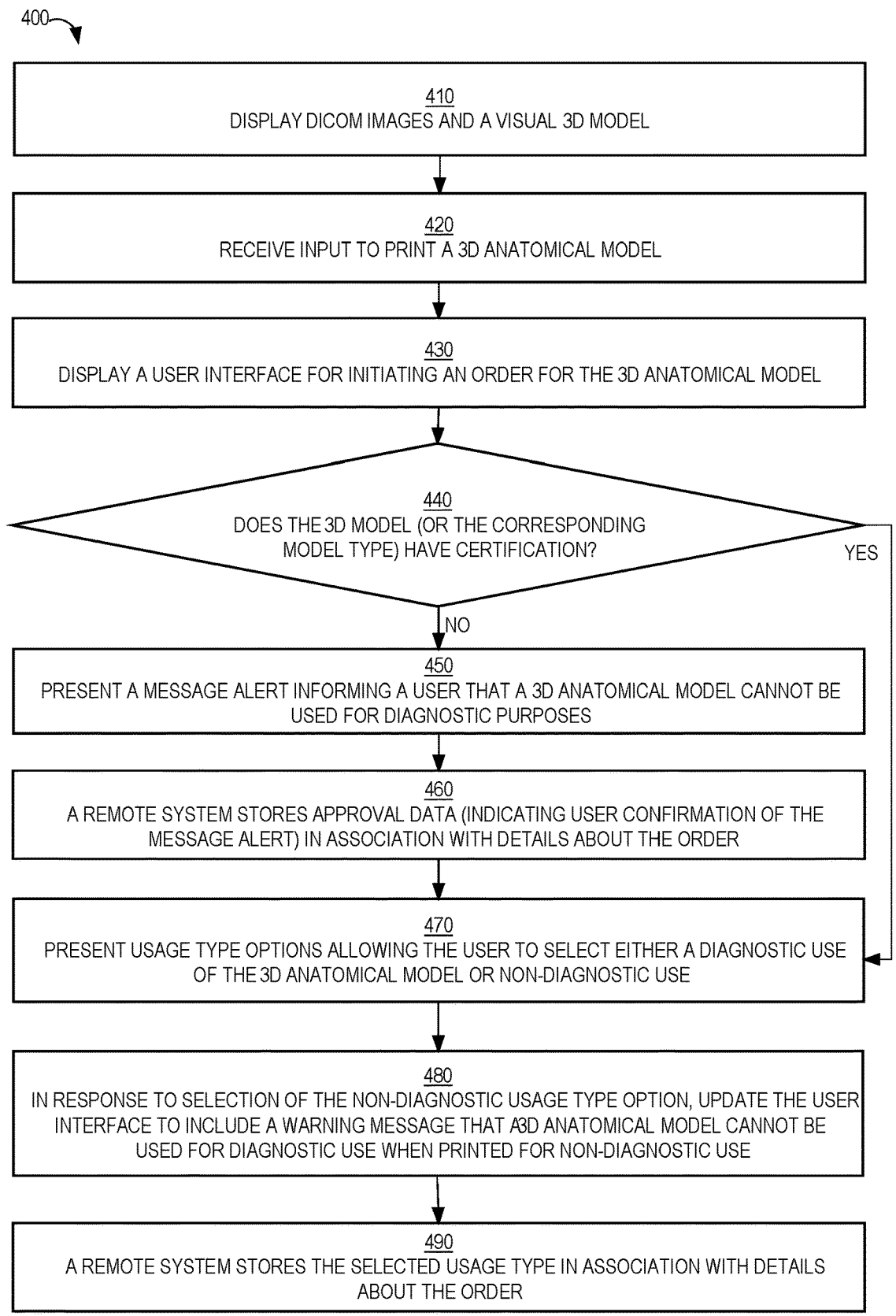
FIG. 4 is a flow diagram the depicts an example process 400 for providing multiple options related to diagnostic and non-diagnostic uses, in an embodiment.

FIG. 4 depicts an example process 400 that may be used to implement an embodiment. For purposes of illustrating a clear example, FIG. 4 provides an overview of programmed functions that may be executed, in one embodiment, by components of FIG. 1 to facilitate the processing of orders for 3D anatomical models for diagnostic use or for non-diagnostic use. Other implementations of FIG. 4 may be used with embodiments other than shown in FIG. 1. FIG. 4 is intended to schematically represent an algorithm, process, or procedure that may be programmed to implement the functions that are described, and are shown at the same level of detail that is customarily used by persons having ordinary skill in the art to which this disclosure pertains to communicate among themselves about how to architect, organize, program, and build computer program applications of the same class or type.

At block 410, a requester computer displays DICOM images and a 3D visual model. Such a display is based on various inputs from a user of the requester computer (e.g., requester client computing device 116), such as input to select a set of DICOM images pertaining to a patient, input to select a particular DICOM image, and input to select a portion of a DICOM image from which a set of one or more 3D printable files are generated. An example of the display is UI 300.

At block 420, the requester computer receives input to print a 3D anatomical model based on the set of one or more 3D printable files. An example of such input is selection of "Send to Print" button 310 in FIG. 3A.

At block 430, the requester computer displays a user interface for initiating an order for the 3D anatomical model. The user interface includes one or more graphical elements to enter information about the 3D model. An example of such a user interface is UI 300 in FIG. 3. The one or more graphical elements may include a drop down menu that allows the user to select an Anatomical Model Type.

At block 440, it is determined whether the indicated Anatomical Model Type has certification. Block 440 may be determined by internal logic of the (e.g., web) application that is presenting the user interface or by a backend system that is communicatively coupled to that application. Such a determination may be based on the model type inputted, or selected, by the user of the requester computer. If the determination is no, then process 400 proceeds to block 450; otherwise, process 400 proceeds to block 470.

At block 450, a message alert is presented on the requester device informing the user thereof that the 3D model cannot be used for diagnostic purposes. Also, a graphical element (e.g., a checkbox) is presented that allows the user to acknowledge the message alert. If the graphical element is not selected, then the order process cannot proceed or, at least, cannot complete.

At block 460, a remote computing system stores approval data (indicating the selection and a user who initiated generation of the approval data) in association with details about the order. For example, the approval data and the order details are transmitted over network 102 to manager server computing device 108, reviewer client computing device 128, and/or data repository 106.

At block 470, usage type options are presented in the user interface, allowing the user to select either a Diagnostic use or a Non-Diagnostic use.

At block 480, in response to selection of the Non-Diagnostic usage type option, the user interface is updated to include a warning message that a 3D anatomical model cannot be used for diagnostic use when printed for non-diagnostic use.

At block 490, order details along with the selected usage type option are transmitted (e.g., over a computer network) to the remote computing system.

V. EXAMPLES

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a computing system, the computing system including one or more processors, one or more storage media or memories coupled to the one or more processors and storing instructions which, when processed or executed by the one or more processors, cause: storing a collection of sets of one or more files for generating a 3D anatomical model; receiving, from a requester computer, first input to print a particular 3D anatomical model based on a set of one or more files in the collection; determining whether the particular 3D anatomical model is associated with a predetermined certification; in response to determining that the particular 3D anatomical model is not associated with the predetermined certification, updating a user interface to indicate that the particular 3D anatomical model cannot be used for a diagnostic purpose; receiving second input that indicates that a user of the requester computer accepts using the particular 3D anatomical model for only non-diagnostic purposes; after receiving the second input, proceeding with an order to generate the particular 3D anatomical model.

A further clause is the computing system of the first clause where the instructions, when processed by the one or more processors, further cause, after receiving the second input, storing, in association with the order, an approval data that the model will not be used for a diagnostic purpose.

A further clause is the computing system of the first clause where the instructions, when processed by the one or more processors, further cause, in response to determining that the particular 3D anatomical model is not associated with the predetermined certification: disabling a first usage option, from among a plurality of usage options, pertaining to diagnostic use, and pre-selecting a second usage option, from among the plurality of usage options, pertaining to non-diagnostic use.

A further clause is the computing system of the first clause where the instructions, when processed by the one or more processors, cause: receiving, from a second requester computer, third input to print a second 3D anatomical model based on a particular set of one or more files; determining whether the second 3D anatomical model is associated with the predetermined certification; in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose; receiving fourth input that indicates that a selection of the first usage option or of the second usage option; storing the selection is association with a second order to generate the second 3D anatomical model.

A further clause is the computing system of the previous clause, wherein: the selection is of the second usage option; the instructions, when processed by the one or more processors, further cause updating the second user interface to indicate that the second 3D anatomical model cannot be used for non-diagnostic use when printing for non-diagnostic use.

A second clause is a computer-implemented method comprising: storing a collection of sets of one or more files for generating a 3D anatomical model; receiving, from a requester computer, first input to print a particular 3D anatomical model based on a set of one or more files in the collection; determining whether the particular 3D anatomical model is associated with a predetermined certification; in response to determining that the particular 3D anatomical model is not associated with the predetermined certification, updating a user interface to indicate that the particular 3D anatomical model cannot be used for a diagnostic purpose; receiving second input that indicates that a user of the requester computer accepts using the particular 3D anatomical model for only non-diagnostic purposes; after receiving the second input, proceeding with an order to generate the particular 3D anatomical model.

A further clause is the method of the second clause where the instructions, when processed by the one or more processors, further cause, after receiving the second input, storing, in association with the order, an approval data that the model will not be used for a diagnostic purpose.

A further clause is the method of the second clause further comprising, in response to determining that the particular 3D anatomical model is not associated with the predetermined certification: disabling a first usage option, from among a plurality of usage options, pertaining to diagnostic use, and pre-selecting a second usage option, from among the plurality of usage options, pertaining to non-diagnostic use.

A further clause is the method of the second clause further comprising: receiving, from a second requester computer, third input to print a second 3D anatomical model based on a particular set of one or more files; determining whether the second 3D anatomical model is associated with the predetermined certification; in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose; receiving fourth input that indicates that a selection of the first usage option or of the second usage option; storing the selection is association with a second order to generate the second 3D anatomical model.

A further clause is the method of the previous clause, wherein: the selection is of the second usage option; the method further comprising updating the second user interface to indicate that the second 3D anatomical model cannot be used for non-diagnostic use when printing for non-diagnostic use.

A third clause is one or more storage media storing instructions which, when processed or executed by one or more processors, cause: storing a collection of sets of one or more files for generating a 3D anatomical model; receiving, from a requester computer, first input to print a particular 3D anatomical model based on a set of one or more files in the collection; determining whether the particular 3D anatomical model is associated with a predetermined certification; in response to determining that the particular 3D anatomical model is not associated with the predetermined certification, updating a user interface to indicate that the particular 3D anatomical model cannot be used for a diagnostic purpose; receiving second input that indicates that a user of the requester computer accepts using the particular 3D anatomical model for only non-diagnostic purposes; after receiving the second input, proceeding with an order to generate the particular 3D anatomical model.

A further clause is the storage media of the third clause where the instructions, when processed by the one or more processors, further cause, after receiving the second input, storing, in association with the order, an approval data that the model will not be used for a diagnostic purpose.

A further clause is the storage media of the third clause where the instructions, when processed by the one or more processors, further cause, in response to determining that the particular 3D anatomical model is not associated with the predetermined certification: disabling a first usage option, from among a plurality of usage options, pertaining to diagnostic use, and pre-selecting a second usage option, from among the plurality of usage options, pertaining to non-diagnostic use.

A further clause is the storage media of the third clause where the instructions, when processed by the one or more processors, cause: receiving, from a second requester computer, third input to print a second 3D anatomical model based on a particular set of one or more files; determining whether the second 3D anatomical model is associated with the predetermined certification; in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose; receiving fourth input that indicates that a selection of the first usage option or of the second usage option; storing the selection is association with a second order to generate the second 3D anatomical model.

A further clause is the storage media of the previous clause, wherein: the selection is of the second usage option; the instructions, when processed by the one or more processors, further cause updating the second user interface to indicate that the second 3D anatomical model cannot be used for non-diagnostic use when printing for non-diagnostic use.

VI. IMPLEMENTATION EXAMPLES

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
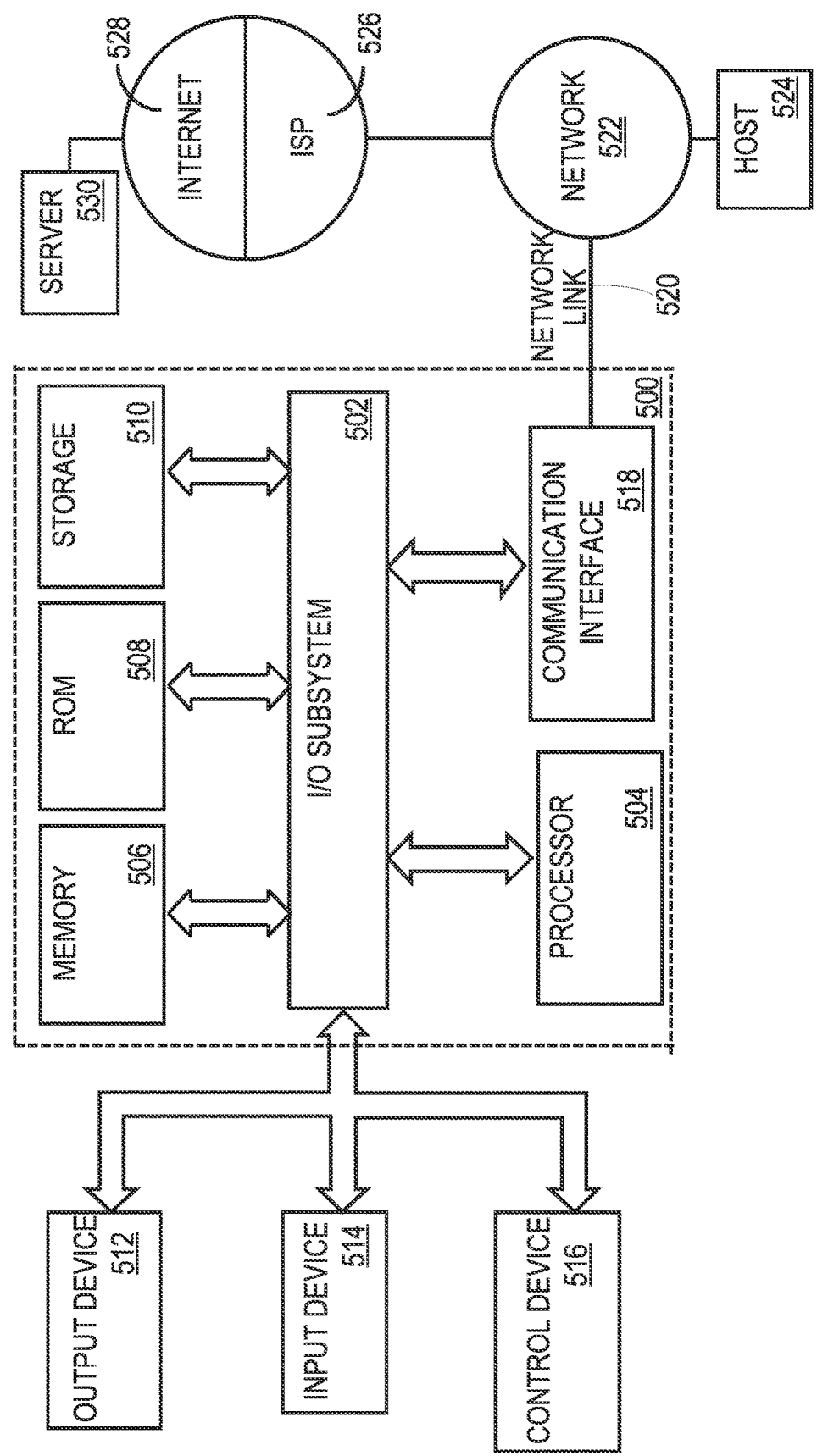
FIG. 5 depicts a block diagram of a computer system on which embodiments may be implemented.

FIG. 5 is a block diagram that depicts an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or Bluetooth technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computing system comprising:
one or more processors; and
one or more memories storing instructions which, when processed by the one or more processors, cause:
storing a collection of sets of one or more files for generating a 3D anatomical model;
receiving, from a requester computer, first input to print a particular 3D anatomical model based on a set of one or more files in the collection;
determining whether the particular 3D anatomical model is associated with a predetermined certification;
in response to determining that the particular 3D anatomical model is not associated with the predetermined certification, updating a user interface to indicate that the particular 3D anatomical model cannot be used for a diagnostic purpose;
receiving second input that indicates that a user of the requester computer accepts using the particular 3D anatomical model for only non-diagnostic purposes;
after receiving the second input, proceeding with an order to generate the particular 3D anatomical model.

2. The computing system of claim 1, wherein the instructions, when processed by the one or more processors, further cause:
after receiving the second input, storing, in association with the order, an approval data that the particular 3D anatomical model will not be used for a diagnostic purpose.

3. The computing system of claim 1, wherein the instructions, when processed by the one or more processors, further cause:
in response to determining that the particular 3D anatomical model is not associated with the predetermined certification:
disabling a first usage option, from among a plurality of usage options, pertaining to diagnostic use, and
pre-selecting a second usage option, from among the plurality of usage options, pertaining to non-diagnostic use.

4. The computing system of claim 1, wherein the instructions, when processed by the one or more processors, further cause:
receiving, from a second requester computer, third input to print a second 3D anatomical model based on a particular set of one or more files;
determining whether the second 3D anatomical model is associated with the predetermined certification;
in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose;

receiving fourth input that indicates that a selection of the first usage option or of the second usage option;

storing the selection is association with a second order to generate the second 3D anatomical model.

5. The computing system of claim 4, wherein:
the selection is of the second usage option;
the instructions, when processed by the one or more processors, further cause:
updating the second user interface to indicate that the second 3D anatomical model cannot be used for non-diagnostic use when printing for non-diagnostic use.

6. A method comprising:
storing a collection of sets of one or more files for generating a 3D anatomical model;
receiving, from a requester computer, first input to print a particular 3D anatomical model based on a set of one or more files in the collection;
determining whether the particular 3D anatomical model is associated with a predetermined certification;
in response to determining that the particular 3D anatomical model is not associated with the predetermined certification, updating a user interface to indicate that the particular 3D anatomical model cannot be used for a diagnostic purpose;
receiving second input that indicates that a user of the requester computer accepts using the particular 3D anatomical model for only non-diagnostic purposes;
after receiving the second input, proceeding with an order to generate the particular 3D anatomical model;
wherein the method is performed by one or more computing devices.

7. The method of claim 6, further comprising:
after receiving the second input, storing, in association with the order, an approval data that the particular 3D anatomical model will not be used for a diagnostic purpose.

8. The method of claim 6, further comprising:
in response to determining that the particular 3D anatomical model is not associated with the predetermined certification:
disabling a first usage option, from among a plurality of usage options, pertaining to diagnostic use, and
pre-selecting a second usage option, from among the plurality of usage options, pertaining to non-diagnostic use.

9. The method of claim 6, further comprising:
receiving, from a second requester computer, third input to print a second 3D anatomical model based on a particular set of one or more files;
determining whether the second 3D anatomical model is associated with the predetermined certification;
in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose;
receiving fourth input that indicates that a selection of the first usage option or of the second usage option;
storing the selection is association with a second order to generate the second 3D anatomical model.

10. The method of claim 9, wherein:
the selection is of the second usage option;
the method further comprising updating the second user interface to indicate that the second 3D anatomical model cannot be used for non-diagnostic use when printing for non-diagnostic use.

11. One or more non-transitory storage media storing instructions which, when executed by one or more processors, cause:
storing a collection of sets of one or more files for generating a 3D anatomical model;
receiving, from a requester computer, first input to print a particular 3D anatomical model based on a set of one or more files in the collection;
determining whether the particular 3D anatomical model is associated with a predetermined certification;
in response to determining that the particular 3D anatomical model is not associated with the predetermined certification, updating a user interface to indicate that the particular 3D anatomical model cannot be used for a diagnostic purpose;
receiving second input that indicates that a user of the requester computer accepts using the particular 3D anatomical model for only non-diagnostic purposes;
after receiving the second input, proceeding with an order to generate the particular 3D anatomical model.

12. The one or more non-transitory storage media of claim 11, wherein the instructions, when processed by the one or more processors, further cause:
after receiving the second input, storing, in association with the order, an approval data that the particular 3D anatomical model will not be used for a diagnostic purpose.

13. The one or more non-transitory storage media of claim 11, wherein the instructions, when processed by the one or more processors, further cause:
in response to determining that the particular 3D anatomical model is not associated with the predetermined certification:
disabling a first usage option, from among a plurality of usage options, pertaining to diagnostic use, and
pre-selecting a second usage option, from among the plurality of usage options, pertaining to non-diagnostic use.

14. The one or more non-transitory storage media of claim 11, wherein the instructions, when processed by the one or more processors, further cause:
receiving, from a second requester computer, third input to print a second 3D anatomical model based on a particular set of one or more files;
determining whether the second 3D anatomical model is associated with the predetermined certification;
in response to determining that the second 3D anatomical model is associated with the predetermined certification, updating a second user interface to include a plurality of usage options for the second 3D anatomical model, wherein the plurality of usage options includes (1) a first usage option that the second 3D anatomical model will be used for a diagnostic purpose and (2) a second usage option that the second 3D anatomical model will be used for a non-diagnostic purpose;
receiving fourth input that indicates that a selection of the first usage option or of the second usage option;
storing the selection is association with a second order to generate the second 3D anatomical model.

15. The one or more non-transitory storage media of claim 14, wherein:
   the selection is of the second usage option;
   the instructions, when processed by the one or more processors, further cause:
   updating the second user interface to indicate that the second 3D anatomical model cannot be used for non-diagnostic use when printing for non-diagnostic use.

\* \* \* \* \*